(12) United States Patent
Kim et al.

(10) Patent No.: US 8,720,261 B2
(45) Date of Patent: May 13, 2014

(54) JIG FOR CRASH TEST OF BRAKE PEDAL

(75) Inventors: Eunsik Kim, Daegu (KR); Jeongseon Min, Hwaseong-si (KR); Yangrae Cho, Hwaseong-si (KR); Donghwan Kim, Ulsan (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 46 days.

(21) Appl. No.: 13/492,300

(22) Filed: Jun. 8, 2012

(65) Prior Publication Data

US 2013/0133413 A1 May 30, 2013

(30) Foreign Application Priority Data

Nov. 25, 2011 (KR) .................. 10-2011-0124030

(51) Int. Cl.
*G01M 13/00* (2006.01)
(52) U.S. Cl.
USPC ...................................... 73/118.01
(58) Field of Classification Search
USPC ................. 73/12.06, 12.13, 118.01
See application file for complete search history.

(56) References Cited

U.S. PATENT DOCUMENTS

| 4,085,609 | A | * | 4/1978 | Kelly | 73/844 |
| 6,116,078 | A | * | 9/2000 | Farrington | 73/12.09 |
| 6,892,564 | B2 | * | 5/2005 | Ishikawa | 73/12.06 |
| 8,297,105 | B2 | * | 10/2012 | Chiang | 73/12.06 |
| 8,443,651 | B2 | * | 5/2013 | Le et al. | 73/12.06 |
| 8,453,490 | B2 | * | 6/2013 | Le et al. | 73/12.06 |
| 8,516,877 | B2 | * | 8/2013 | Le et al. | 73/12.06 |
| 2012/0017664 | A1 | * | 1/2012 | Le et al. | 73/12.06 |

FOREIGN PATENT DOCUMENTS

| KR | 2002-0058844 A | 7/2002 |
| KR | 10-0358896 B1 | 10/2002 |
| KR | 10-0401864 B1 | 10/2003 |
| KR | 10-0611411 B1 | 8/2006 |
| KR | 10-2010-0064421 A | 6/2010 |
| KR | 10-2011-0072700 A | 6/2011 |

* cited by examiner

*Primary Examiner* — Freddie Kirkland, III
(74) *Attorney, Agent, or Firm* — Morgan, Lewis & Bockius LLP

(57) ABSTRACT

The jig may include a base plate having mounting surfaces, upper mounting holes formed in the mounting surfaces and disposed symmetrically, lower mounting holes formed through both of the mounting surfaces, respectively, and disposed under the upper mounting holes, an upper support bracket having one end connected to both of the upper mounting holes and another end fixed and connected to one mounting surface, a lower support bracket having one end connected to both of the lower mounting holes and another end fixed and connected to another mounting surface, a first sample fixing rod connected and supported across the upper support bracket at both sides, and a second sample fixing rod connected and supported across the lower support bracket at both sides.

5 Claims, 22 Drawing Sheets

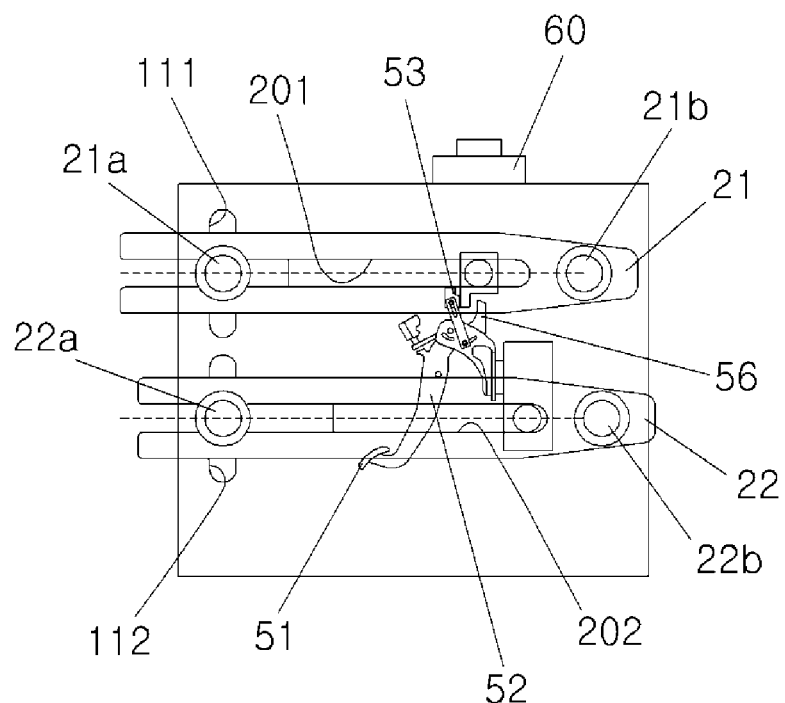

JIG FOR CRASH TEST OF BRAKE PEDAL

CROSS-REFERENCE TO RELATED APPLICATIONS

The present application claims priority of Korean Patent Application Number 10-2011-0124030 filed Nov. 25, 2011, the entire contents of which application is incorporated herein for all purposes by this reference.

BACKGROUND OF INVENTION

1. Field of Invention

The present invention relates to a jig for a crash test of a brake pedal, and more particularly, to a jig for a crash test of a brake pedal, which is capable of obtaining a crash test result similar to that of an actual vehicle.

2. Description of Related Art

In general, when a vehicle crash occurs, a brake pedal as well as a vehicle frame is deformed as illustrated in FIGS. 1A and 1B.

In order to minimize injuries of people in the front seats (a driver seat and a front passenger seat) by testing the deformation of the brake pedal during the above-described vehicle crash, a crash test is performed in a state where a jig similar to an actual jig is installed.

During the crash test, effects on the human body, caused by a crash, are tested in a state where the jig is installed. In this case, precise setting is required to acquire correct data.

That is, as illustrated in FIG. 2, the jig for a crash test of a brake pedal according to the related art is used for measuring horizontal intrusion of a brake pedal, which is caused by an impact applied in an H direction.

However, in the case of an actual vehicle which actually crashes against another vehicle, the vehicle frame thereof may be deformed in horizontal, vertical, and rotational directions. Therefore, the jig for measuring horizontal intrusion has a limitation in verifying a product.

Further, there is no equipment capable of performing a component crash according to a similar tendency to an actual vehicle.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a jig for a crash test of a brake pedal, which is capable of obtaining a crash test result similar to that of an actual vehicle.

Various aspects of the present invention provide for a jig for a crash test of a brake pedal, including a base plate having mounting surfaces formed in both sides, upper mounting holes formed through both of the mounting surfaces, respectively, and disposed symmetrically with each other, lower mounting holes formed through both of the mounting surfaces, respectively, and disposed under the upper mounting holes, an upper support bracket having one end connected to both of the upper mounting holes and the other end fixed and connected to one mounting surface, a lower support bracket having one end connected to both of the lower mounting holes and the other end fixed and connected to the other mounting surface, a first sample fixing rod connected and supported across the upper support bracket at both sides, and a second sample fixing rod connected and supported across the lower support bracket at both sides.

The jig may include first and second samples fixed and connected to the first and second sample fixing rods, respectively.

The upper and lower support brackets may be coupled to the upper mounting holes, respectively, through bolts.

The upper and lower support brackets may include a guide groove extended along the longitudinal direction thereof.

The jig may include a crash test member connected so as to crash against the first and second samples.

The jig may include an upper fixing jig formed on the top surface of the base plate so as to fix and support the first sample fixing rod and a lower fixing jig formed on the bottom surface of the base plate so as to support the second sample fixing rod.

The crash test member may include a pedal member, a pedal arm having one end hinge-connected to the pedal member, a first mount portion connected to the other end of the pedal arm such that the pedal arm is turned about a hinge portion, a second mount portion connected so as to be turned about the hinge portion, a link member having one end hinge-connected to the first mount portion and the other end hinge-connected to a locking shaft passing through the second mount portion, a lever hinge-connected to the opposite side of the link member around the locking shaft, and a locking protrusion formed at the end of the pedal arm and protruded so as to be locked according to movement of the locking shaft.

The second mount portion may have a through-hole formed therein, and the locking shaft may be formed so as to move along the through-hole.

The lower fixing jig may be used to fix the second sample fixing rod when intrusion is measured during a crash of the first sample, and the upper fixing jig may be used to fix the first sample fixing rod when intrusion is measured during a crash of the second sample.

The upper and lower mounting holes may be formed in a direction perpendicular to the mounting surfaces.

Since a crash test result similar to an actual vehicle may be derived from a single jig, the test cost for an actual vehicle may be reduced, and merchantability relating to crash may be improved.

Further, since crash performance may be easily checked from a single product, various ideas may be derived to significantly improve crash performance.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIGS. 7A and 7B illustrate a state where an exemplary second mount portion of the crash test member applied to the jig for a crash test of a brake pedal according to the present invention is pushed.

Figure 1A:
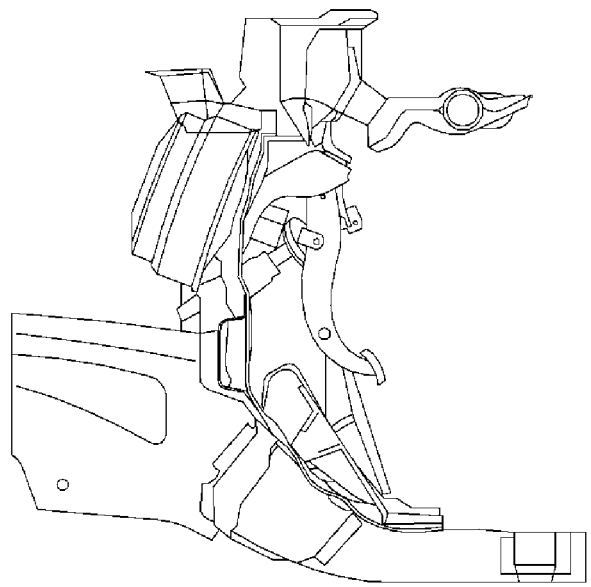
FIG. 1 illustrates deformation of a brake pedal which occurs during crash of a general vehicle.
Figure 1B:
Figure 2:
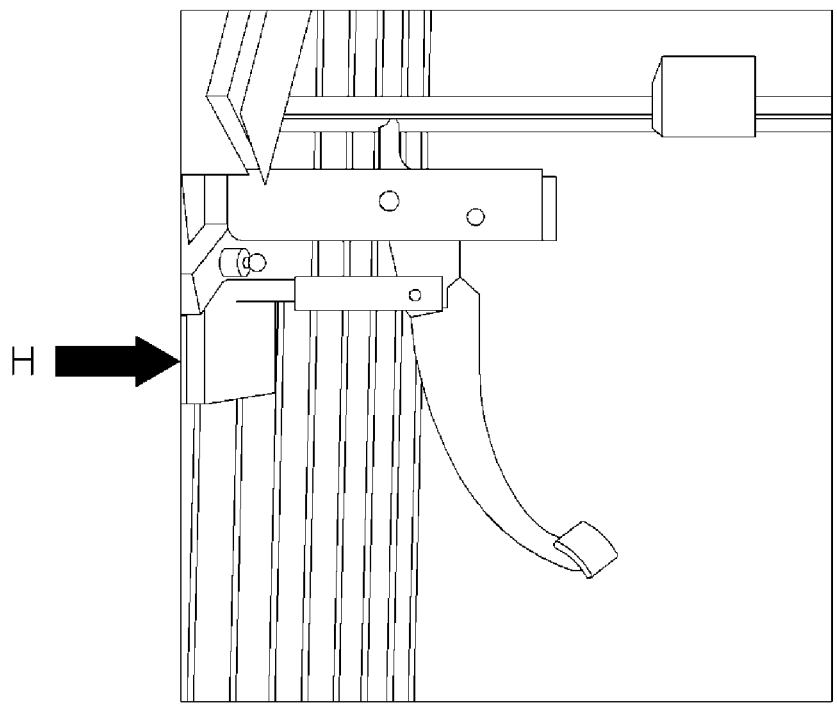
FIG. 2 illustrates a jig for a crash test of a brake pedal according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 3A:
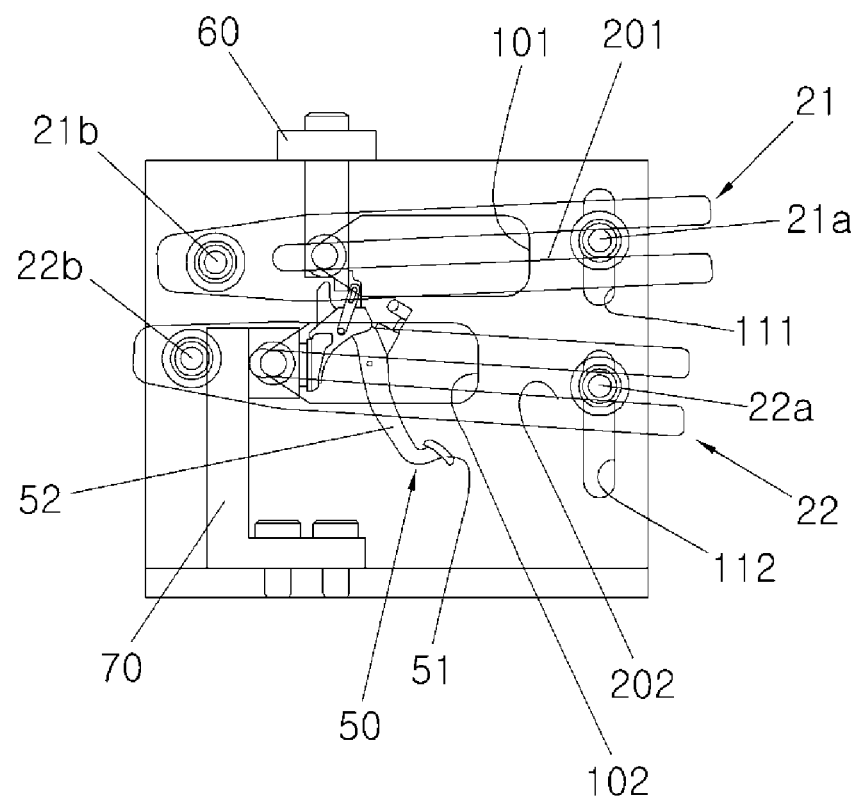
FIGS. 3A and 3B illustrate an exemplary jig for a crash test of a brake pedal according to the present invention.
Figure 3B:
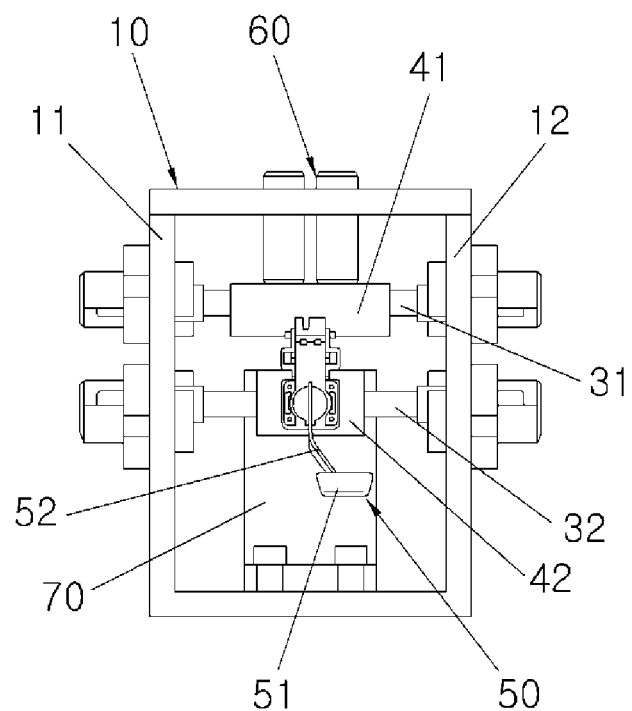

FIGS. 3A and 3B illustrate a jig for a crash test of a brake pedal according to various embodiments of the present invention. As illustrated in FIGS. 3A and 3B, the jig for a crash test of a brake pedal according to various embodiments of the present invention includes a base plate 10, upper mounting holes 111, lower mounting holes 112, an upper support bracket 21, a lower support bracket 22, a first sample fixing rod 31, and a second sample fixing rod 32, and a crash test member 50.

Base plate 10 is formed in a rectangular frame shape of which the upper surface and the front and rear surfaces are opened. Base plate 10 serves to support upper and lower support brackets 21 and 22 which will be described below.

Upper mounting holes 111 and lower mounting holes 112 are formed through both side surfaces 11 and 12 of base plate 10, respectively. Upper mounting holes 111 and lower mounting holes 112, respectively, are formed symmetrically with each other at both side surfaces 11 and 12 of base plate 10.

That is, the pair of upper mounting holes 111 may be formed through both side surfaces 11 and 12 of base plate 10, respectively, so as to face each other at substantially the same level. Similarly, the pair of lower mounting holes 112 may be positioned under upper mounting holes 111 and formed symmetrically with each other at both side surfaces 11 and 12 of base plate 10. Upper mounting holes 111 and lower mounting holes 112 may be formed in a shape extended in a vertical direction such that the levels of upper support bracket 21 and lower support bracket 22 may be controlled.

First sample fixing rod 31 and second sample fixing rod 32 are installed so as to be inserted into and supported by upper mounting holes 111 and lower mounting holes 112, respectively. At this time, base plate 10 has operation grooves 101 and 102 formed in both side surfaces thereof such that interference does not occur while first and second sample fixing rods 31 and 32 are moved in the four directions. That is, first and second sample fixing rods 31 and 32 are installed through operation grooves 101 and 102. At this time, first and second sample fixing rods 31 and 32 are coupled to upper and lower support brackets 21 and 22 through operation grooves 101 and 102.

Upper and lower support brackets 21 and 22 have guide grooves 201 and 202 formed in an elongated hole shape along the longitudinal direction thereof. Guide grooves 201 and 202 guide a path along which upper and lower support brackets 21 and 22 are moved front and back.

Meanwhile, first and second samples 41 and 42 are installed on first and second sample fixing rods 31 and 32, respectively. First and second samples 41 and 42 are samples for evaluating crash characteristics of a vehicle. For example, first sample 41 may be applied as a sample corresponding to a cowl panel of the vehicle, and second sample 42 may be applied as a sample corresponding to a dash panel disposed under the cowl panel.

First and second samples 41 and 42 may be fixed to first and second sample fixing rods 31 and 32, respectively. An upper fixing jig 60 is formed on the top surface of base plate 10 so as to fix and support first sample fixing rod 31, and a lower fixing jig 70 is formed on the bottom surface of base plate 10 so as to fix and support second sample fixing rod 32.

A crash test member 50 is installed to measure intrusion which occurs when an impact is applied to first or second sample 41 or 42.

Figure 4:
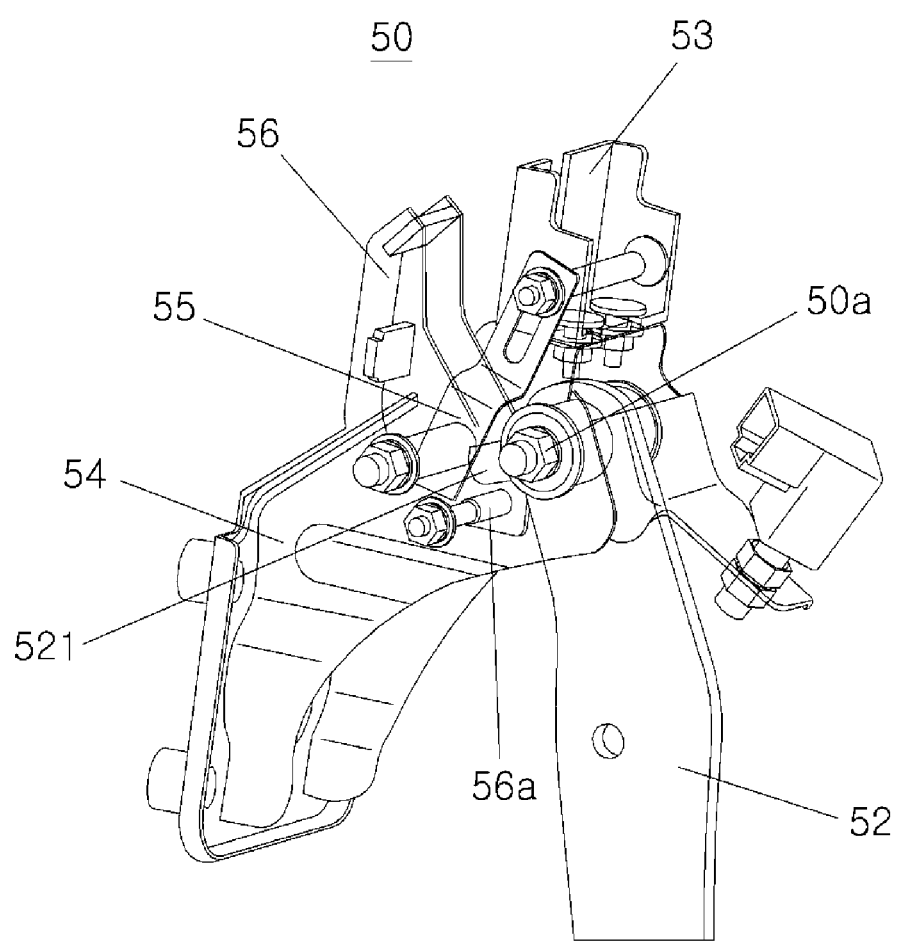
FIG. 4 illustrates an exemplary crash test member which is applied to the jig for a crash test of a brake pedal according to the present invention.

FIG. 4 illustrates the crash test member which is applied to the jig for a crash test of a brake pedal according to various embodiments of the present invention. As illustrated in FIG. 4, crash test member 50 is pushed backward when crashing against first or second sample 41 and 42, and simultaneously turns a pedal member 51 in the opposite side of a driver. Crash test member 50 includes pedal member 51, a pedal arm 52, a first mount portion 53, a second mount portion 54, a link member 55, and a lever 56.

Pedal member 51 serves to receive a step force when a driver steps on a brake pedal. Pedal arm 52 has one end hinge-connected to pedal member 51 and receives a turning force of pedal member 51 through a hinge 50a formed at the other end thereof.

Hinge portion 50a is hinge-connected to first and second mount portions 53 and 54 on the same shaft. Here, first mount portion 53 is disposed at a position where first mount portion 53 crashes against first sample 41, and second mount portion 54 is disposed at a position where second mount portion 54 crashes against second sample 42.

Both ends of link member 55 are hinge-connected to first and second mount portions 53 and 54, respectively.

Figure 5A:
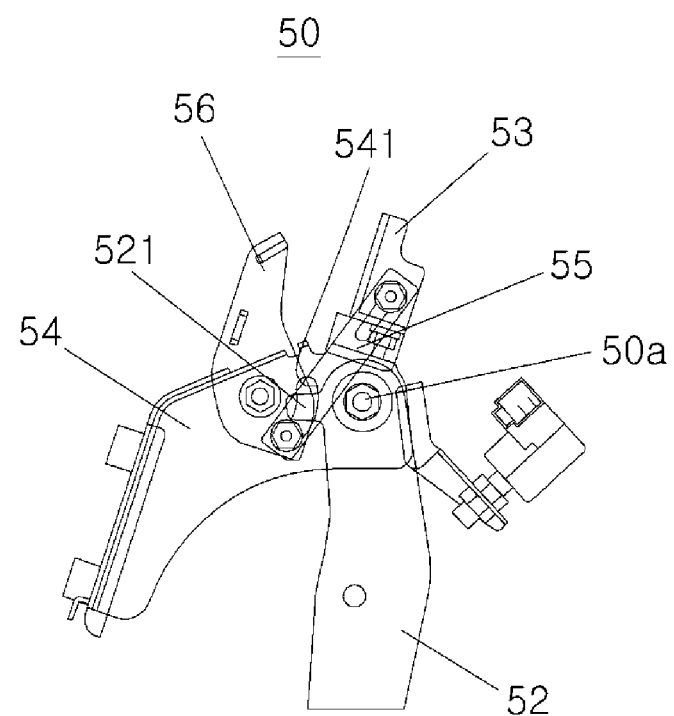
FIGS. 5A and 5B illustrate a state where an exemplary first mount portion of the crash test member applied to the jig for a crash test of a brake pedal according to the present invention is pushed.
Figure 5B:
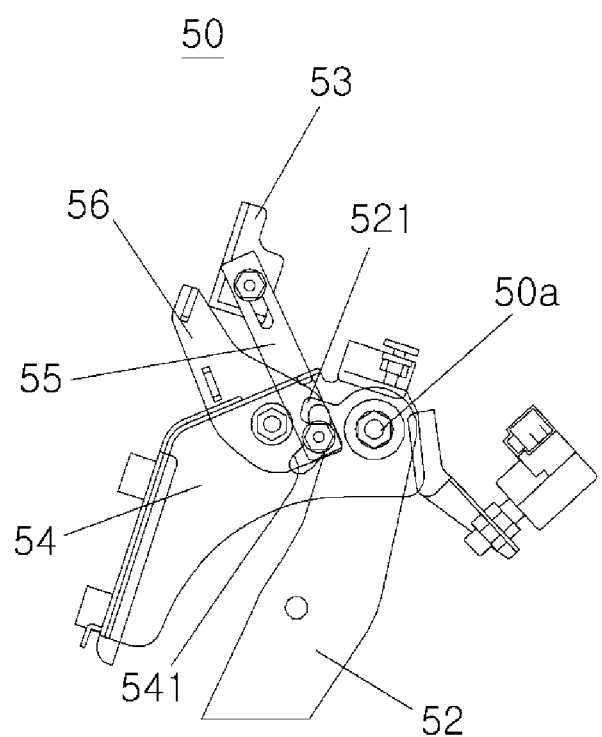
Figure 6A:
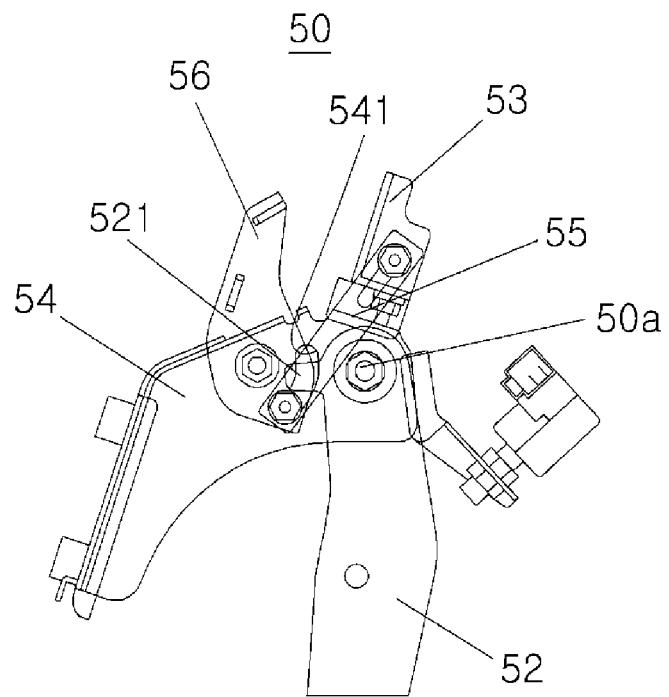
FIGS. 6A and 6B are side views illustrating states before and after crash in FIGS. 5A and 5B.
Figure 6B:
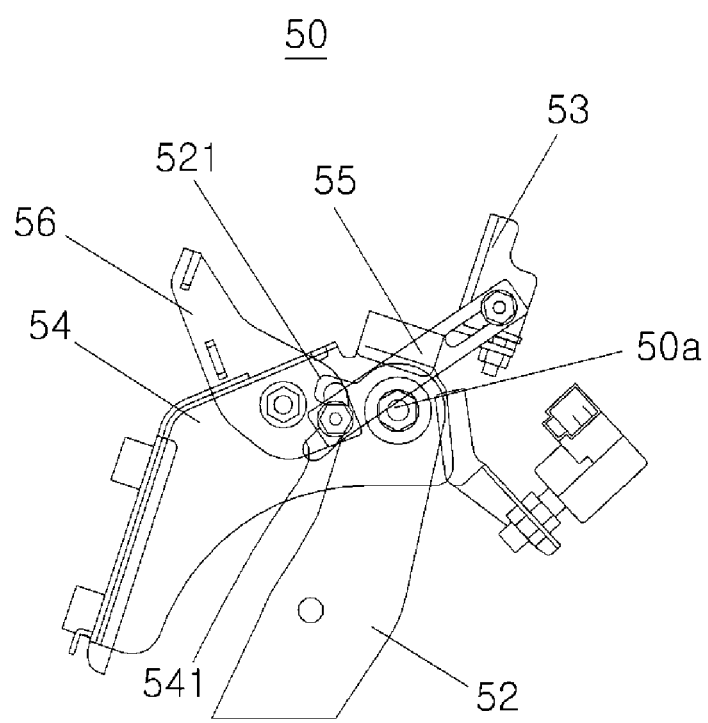

FIGS. 5A and 5B illustrate a state where the first mount portion of the crash test member applied to the jig for a crash test of a brake pedal according to various embodiments of the present invention is pushed. FIGS. 6A and 6B illustrate a state where the second mount portion of the crash test member applied to the jig for a crash test of a brake pedal according to various embodiments of the present invention is pushed.

Referring to FIGS. 5A and 5B, when first mount portion 53 freely moves and second mount portion 54 is pushed, first mount portion 54 is pulled by link member 55 connected to second mount portion 54 at the same time as second mount portion 54 is pushed. At this time, a locking shaft 56a installed through a through-hole 541 of second mount portion 54 is moved along through-hole 541, and pushes a locking protrusion 521 formed on pedal arm 52 toward the upper side in the drawings. Therefore, pedal arm 52 is turned in the opposite direction of the turning of second mount portion 54. Accordingly, during a crash, the pedal arm is turned in the opposite side of the driver's ankle, thereby preventing an injury of the driver.

FIGS. 6A and 6B are side views illustrating states before and after crash in FIGS. 5A and 5B. As illustrated in FIG. 6A, upper and lower support brackets 21 and 22 are installed in upper and lower mounting holes 111 and 112 positioned in both side surfaces 11 and 12 of base plate 10. At this time, the levels of upper and lower support brackets 21 and 22 are controlled so as to be horizontal to the ground surface.

Then, first and second sample fixing rods 31 and 32 are inserted into guide grooves 201 and 202 of upper and lower support brackets 21 and 22. Here, first sample fixing rod 31 is fixed by upper fixing jig 60 so as not to be moved. That is, first sample 41 installed on first sample fixing rod 31 may correspond to a cowl panel of an actual vehicle for a crash test. Second sample 42 installed on second sample fixing rod 32 positioned under first sample fixing rod 31 may correspond to a dash panel of the actual vehicle for a crash test. At this time, second sample fixing rod 32 maintains a free motion state.

Then, when an impact is applied to second sample 42 contacted with second mount portion 54 of crash test member 50, the intrusion of crash test member 50 may be measured at the same time as second sample 42 is deformed and moved in the crash direction as illustrated in FIG. 6B.

Figure 7B:
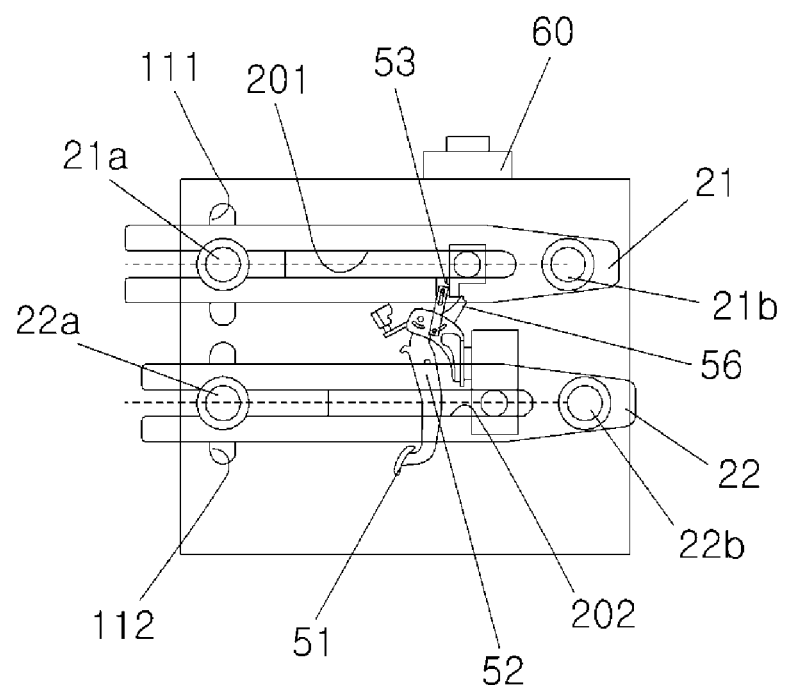

FIGS. 7A and 7B illustrate a state where the second mount portion of the crash test member applied to the jig for a crash test of a brake pedal according to various embodiments of the present invention is pushed. Referring to FIGS. 7A and 7B, when second mount portion 54 freely moves and first mount portion 53 is pushed, second mount portion 54 is pulled by link member 55 connected to first mount portion 53 at the same time as first mount portion 53 is pushed. At this time, locking shaft 56a is moved along through-hole 541 of second mount portion 54 toward the upper side in the drawings, and pushes locking protrusion 521 of pedal arm 52 toward the upper side in the drawings. Therefore, pedal arm 52 is turned in the same direction as first mount portion 53.

Figure 8A:
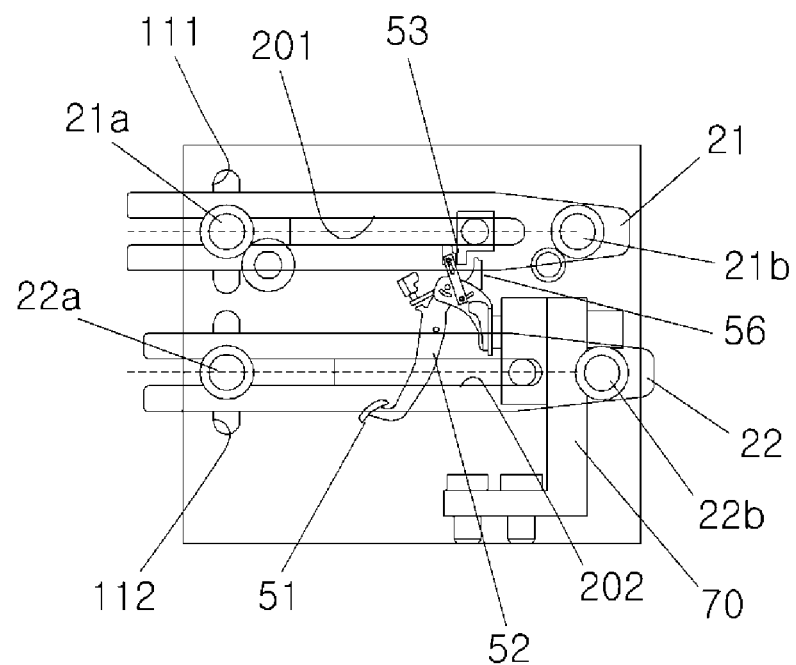
FIGS. 8A and 8B are side views illustrating states before and after crash in FIGS. 7A and 7B.
Figure 8B:
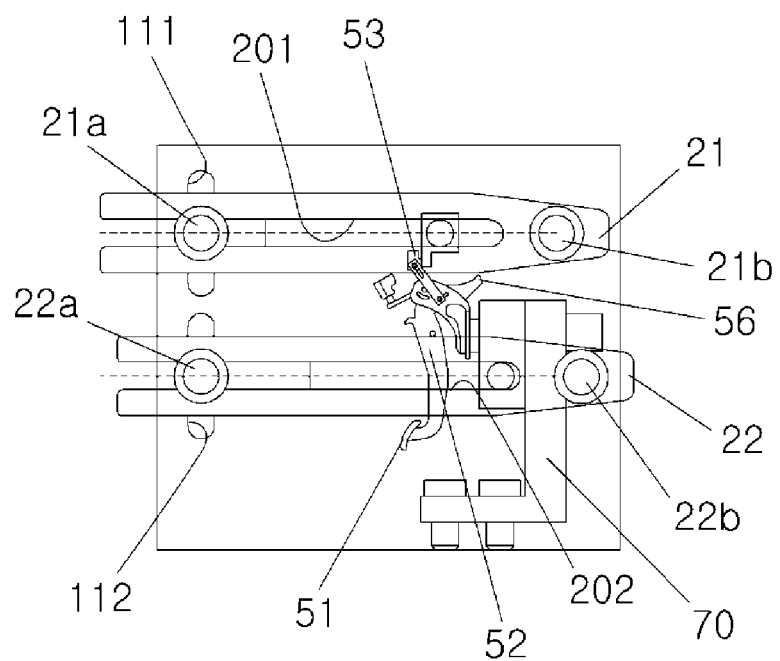

FIGS. 8A and 8B are side views illustrating states before and after crash in FIGS. 7A and 7B. As illustrated in FIG. 8A, upper and lower support brackets 21 and 22 are installed in upper and lower mounting holes 111 and 112 positioned at both side surfaces 11 and 12 of base plate 10. At this time, the levels of upper and lower support brackets 21 and 22 are controlled so as to be horizontal to the ground surface. One ends of upper and lower support brackets 21 and 22 may be connected to upper and lower mounting holes 111 and 112 of both side surfaces 11 and 12 through coupling members 21a and 22a, respectively, and the other ends of upper and lower support brackets 21 and 22 may be connected through coupling members 21b and 22b, respectively.

First and second sample fixing rods 31 and 32 are inserted into guide grooves 201 and 202 of upper and lower support brackets 21 and 22. Here, second sample fixing rod 32 is fixed by lower fixing jig 70 so as not to be moved. At this time, first sample fixing rod 31 maintains a free motion state.

When an impact is applied to first sample 41 contacted with first mount portion 53 of crash test member 50, the intrusion of crash test member 50 may be measured at the same time as first sample 41 is deformed and moved in the crash direction as illustrated in FIG. 8A.

Figure 9A:
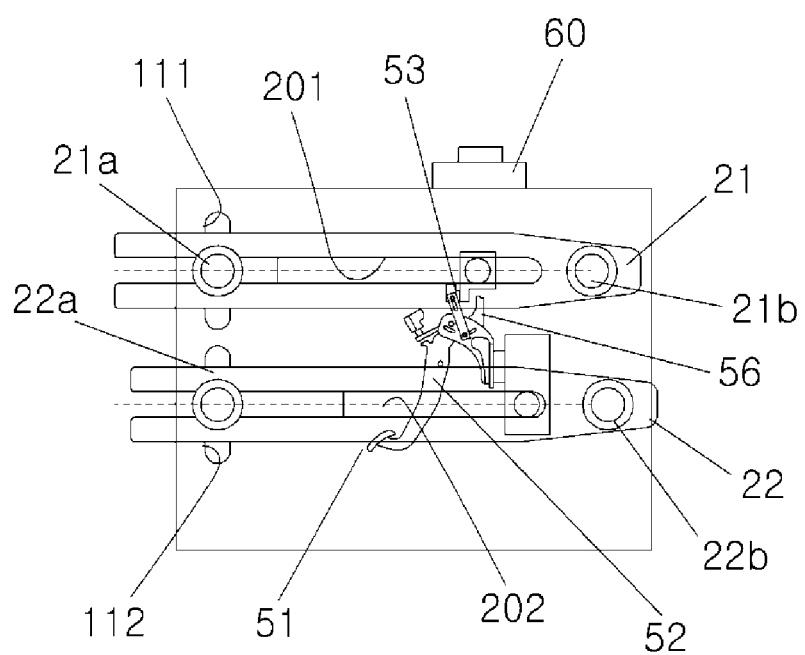
FIGS. 9A and 9B illustrate a state where the level of an exemplary lower support bracket is varied to perform a crash test in a state where an upper fixing jig of the jig for a crash test of a brake pedal according to the present invention is fixed.
Figure 9B:
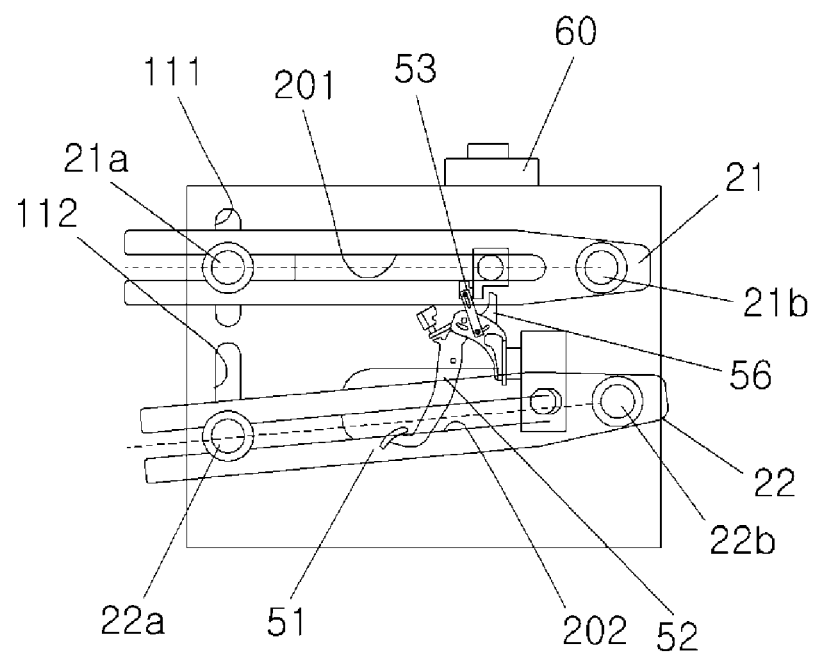
Figure 10A:
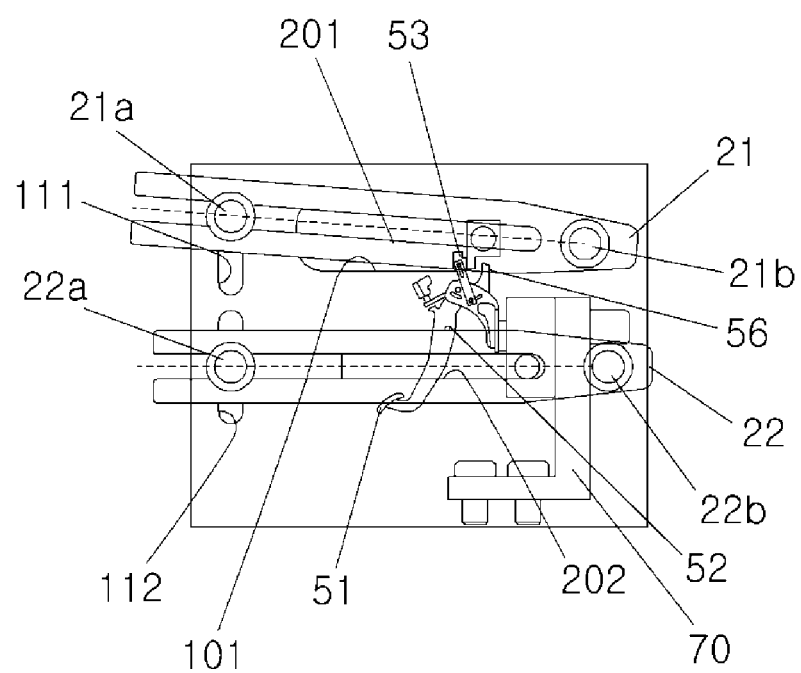
FIGS. 10A and 10B illustrate a state where the level of an exemplary upper support bracket is varied to perform a crash test in a state where a lower fixing jig of the jig for a crash test of a brake pedal according to the present invention is fixed.
Figure 10B:
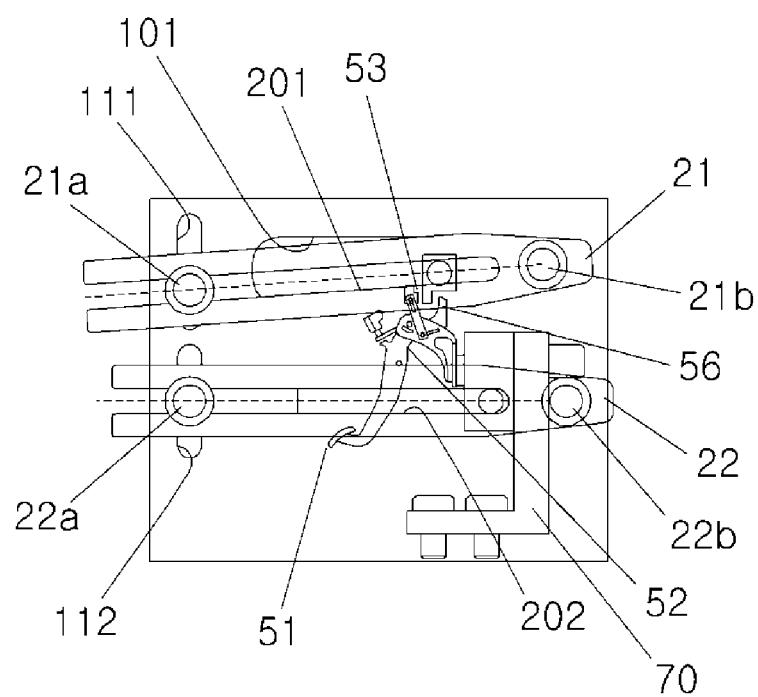

FIGS. 9A and 9B illustrate a state where the level of the lower support bracket is varied to perform a crash test in a state where the upper fixing jig of the jig for a crash test of a brake pedal according to various embodiments of the present invention is fixed. FIGS. 10A and 10B illustrate a state where the level of the upper support bracket is varied to perform a crash test in a state where the lower fixing jig of the jig for a crash test of a brake pedal according to various embodiments of the present invention is fixed. Referring to FIGS. 9A and 9B and FIGS. 10A and 10B, first or second sample fixing rod 31 or 32 may be fixed by upper and lower fixing jigs 60 and 70 to selectively perform a crash test on first or second sample 41 or 42 as described above. When coupling members 21a and 22a of upper and lower support brackets 21 and 22 supporting first sample fixing rod 31 are released to control the levels of one ends thereof, the direction of an impact applied to crash test member 50 may be controlled obliquely in a vertical direction. Therefore, various crash test conditions may be set.

Figure 11A:
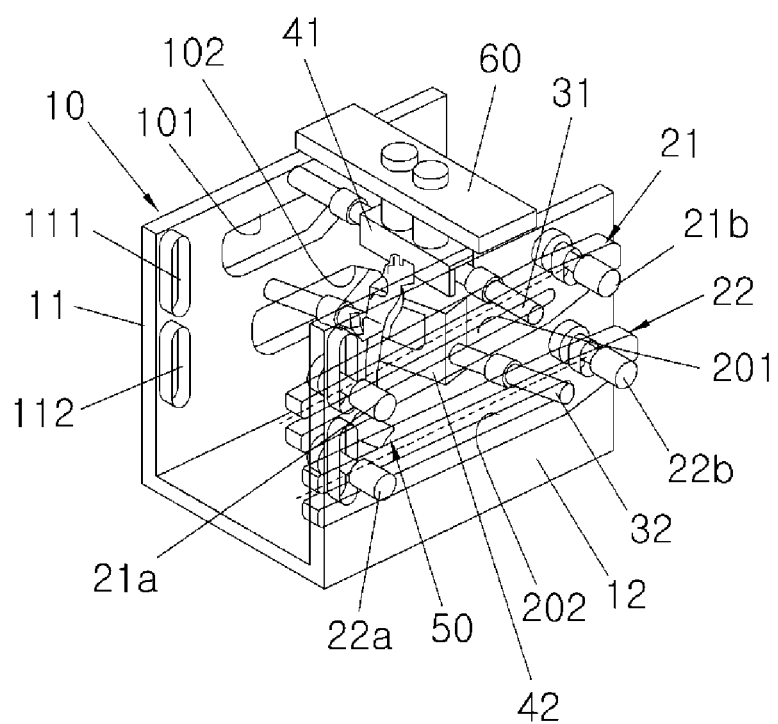
FIGS. 11A and 11B illustrate an exemplary state where a turning change amount is measured in a state where the upper fixing jig of the jig for a crash test of a brake pedal according to the present invention is fixed.
Figure 11B:
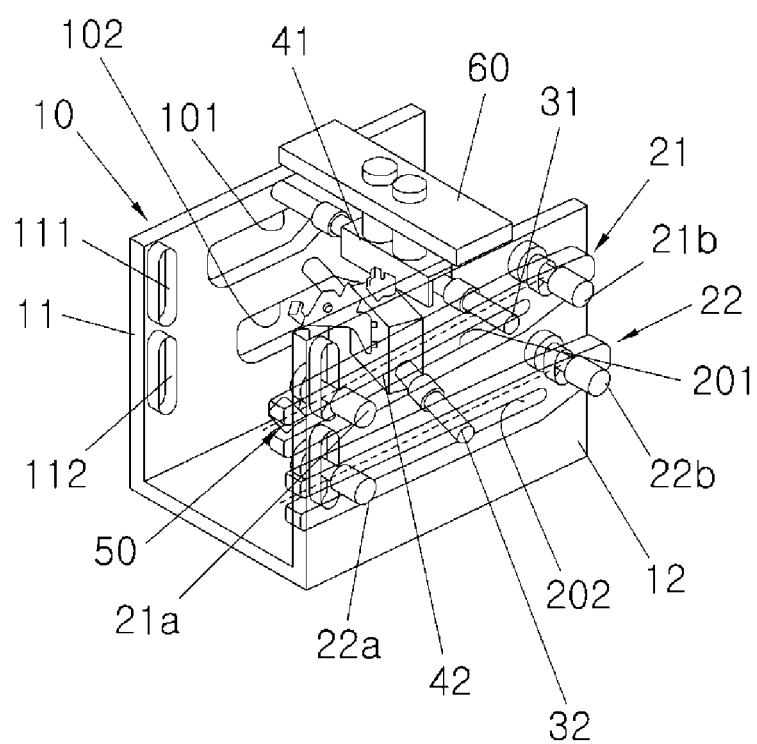
Figure 12A:
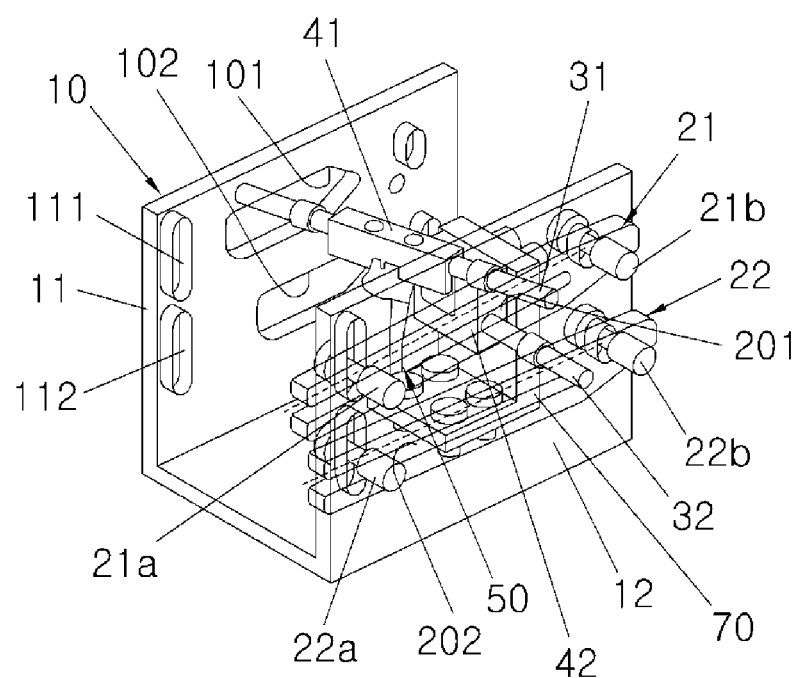
FIGS. 12A and 12B illustrate an exemplary state where a turning change amount is measured in a state where the lower fixing jig of the jig for a crash test of a brake pedal according to the present invention is fixed.
Figure 12B:
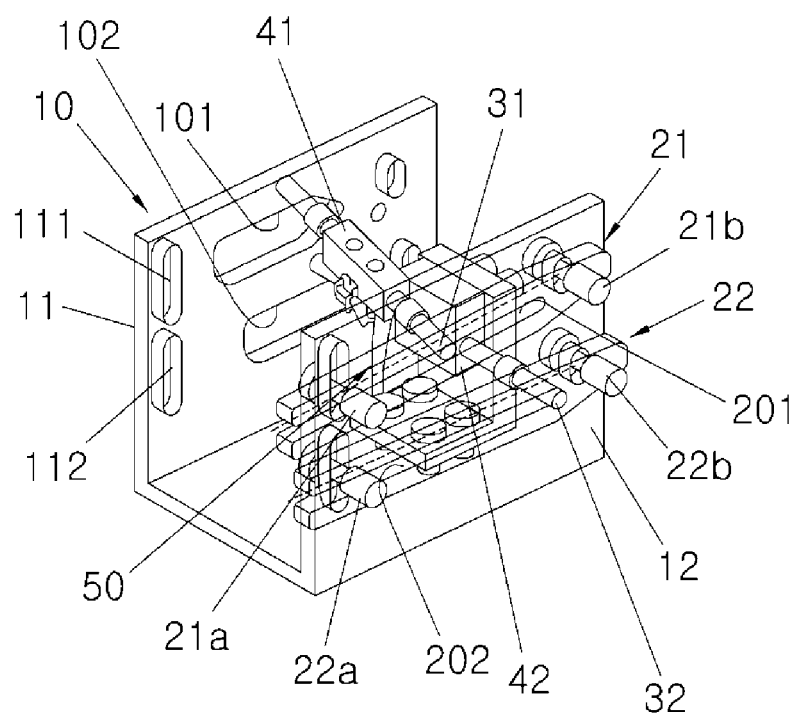

FIGS. 11A and 11B illustrate a state where a turning change amount is measured in a state where the upper fixing jig of the jig for a crash test of a brake pedal according to various embodiments of the present invention is fixed. FIGS. 12A and 12B illustrate a state where a turning change amount is measured in a state where the lower fixing jig of the jig for a crash test of a brake pedal according to various embodiments of the present invention is fixed. Referring to FIGS. 11A and 11B and FIGS. 12A and 12B, as first or second sample fixing rod 31 or 32 is fixed by upper or lower fixing jigs 60 and 70, a side-to-side angle at which first and second sample fixing rods 31 and 32 are placed in upper and lower support brackets 21 and 22 may be varied with respect to first and second samples 41 and 42. Therefore, it is possible to measure intrusion caused by an impact which is applied while biased toward the right or left side of first and second samples 41 and 42.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof.

It is intended that the scope of the invention be defined by the Claims appended hereto and their equivalents.

What is claimed is:

1. A jig for a crash test of a brake pedal, comprising:
    a base plate having mounting surfaces formed on both sides;
    upper mounting holes formed through each of the mounting surfaces, respectively, and disposed symmetrically with respect to each other;
    lower mounting holes formed through each of the mounting surfaces, respectively, and disposed under the upper mounting holes;
    an upper support bracket having one end connected to both of the upper mounting holes and another end fixed and connected to one mounting surface;
    a lower support bracket having one end connected to both of the lower mounting holes and another end fixed and connected to another mounting surface;
    a first sample fixing rod connected and supported across the upper support bracket at both sides;
    a second sample fixing rod connected and supported across the lower support bracket at both sides;
    first and second samples fixed and connected to the first and second sample fixing rods, respectively, wherein the upper and lower support brackets are coupled to the upper mounting holes, respectively, through bolts, and the upper and lower support brackets comprise a guide groove extended along the longitudinal direction thereof;
    a crash test member provided so as to crash against the first and second samples; and
    an upper fixing jig formed on the top surface of the base plate so as to fix and support the first sample fixing rod and a lower fixing jig formed on the bottom surface of the base plate so as to support the second sample fixing rod.

2. The jig as defined in claim 1, wherein the upper and lower mounting holes are formed in a direction perpendicular to the mounting surfaces.

3. A jig for a crash test of a brake pedal, comprising:
    a base plate having mounting surfaces formed on both sides;
    upper mounting holes formed through each of the mounting surfaces, respectively, and disposed symmetrically with respect to each other;
    lower mounting holes formed through each of the mounting surfaces, respectively, and disposed under the upper mounting holes;
    an upper support bracket having one end connected to both of the upper mounting holes and another end fixed and connected to one mounting surface;
    a lower support bracket having one end connected to both of the lower mounting holes and another end fixed and connected to another mounting surface;
    a first sample fixing rod connected and supported across the upper support bracket at both sides;
    a second sample fixing rod connected and supported across the lower support bracket at both sides;
    first and second samples fixed and connected to the first and second sample fixing rods, respectively wherein the upper and lower support brackets are coupled to the upper mounting holes, respectively, through bolts, and the upper and lower support brackets comprise a guide groove extended along the longitudinal direction thereof;
    a crash test member provided so as to crash against the first and second samples; and
    an upper fixing jig formed on the top surface of the base plate so as to fix and support the first sample fixing rod and a lower fixing jig formed on the bottom surface of the base plate so as to support the second sample fixing rod;
    wherein the crash test member comprises:
        a pedal member;
        a pedal arm having one end hingedly connected to the pedal member;
        a first mount portion connected to another end of the pedal arm such that the pedal arm is rotated about a hinge portion;
        a second mount portion connected so as to be rotated about the hinge portion;
        a link member having one end hingedly connected to the first mount portion and another end hingedly connected to a locking shaft passing through the second mount portion;
        a lever hingedly connected to the opposite side of the link member around the locking shaft; and
        a locking protrusion formed at the end of the pedal arm and protruded so as to be locked according to movement of the locking shaft.

4. The jig as defined in claim 3, wherein the second mount portion has a through-hole formed therein, and the locking shaft is formed so as to move along the through-hole.

5. The jig as defined in claim 4, wherein the lower fixing jig is used to fix the second sample fixing rod when intrusion is measured during a crash of the first sample, and the upper fixing jig is used to fix the first sample fixing rod when intrusion is measured during a crash of the second sample.

* * * * *